(12) United States Patent
Lee et al.

(10) Patent No.: US 8,983,871 B2
(45) Date of Patent: Mar. 17, 2015

(54) SYSTEM AND METHOD FOR PROVIDING SERVICE TO END TERMINAL THAT USES AUTHENTICATION INFORMATION OF ANOTHER MOBILE COMMUNICATION TERMINAL, SERVICE SERVER, MOBILE COMMUNICATION TERMINAL, END TERMINAL, AND STORAGE MEDIUM

(75) Inventors: Jeong Hoon Lee, Seoul (KR); Jeong Min You, Seoul (KR); In Hwan Kim, Seoul (KR); Hoo Jong Kim, Seoul (KR); Sung Il Kim, Gyeonggi-Do (KR)

(73) Assignee: SK Telecom Co., Ltd. (KR)

( * ) Notice: Subject to any disclaimer, the term of this patent is extended or adjusted under 35 U.S.C. 154(b) by 385 days.

(21) Appl. No.: 13/133,881

(22) PCT Filed: Oct. 13, 2009

(86) PCT No.: PCT/KR2009/005860
§ 371 (c)(1),
(2), (4) Date: Jun. 9, 2011

(87) PCT Pub. No.: WO2010/067954
PCT Pub. Date: Jun. 17, 2010

(65) Prior Publication Data
US 2011/0246343 A1    Oct. 6, 2011

(30) Foreign Application Priority Data
Dec. 12, 2008  (KR) .................. 10-2008-0126343

(51) Int. Cl.
*G06F 21/00*    (2013.01)
*G06Q 20/00*    (2012.01)
(Continued)

(52) U.S. Cl.
CPC .............. *H04W 12/06* (2013.01); *G06Q 30/04* (2013.01); *H04L 63/0492* (2013.01);
(Continued)

(58) Field of Classification Search
USPC ........................................ 705/67
See application file for complete search history.

(56) References Cited

U.S. PATENT DOCUMENTS

| 5,915,215 | A | * | 6/1999 | Williams et al. | ........... 455/422.1 |
| 5,915,224 | A | * | 6/1999 | Jonsson | ...................... 455/552.1 |

(Continued)

FOREIGN PATENT DOCUMENTS

| KR | 1020070045767 | 5/2007 |
| KR | 100825457 | 4/2008 |

OTHER PUBLICATIONS

The Examiner defines "authenticate" as "to make authoritative or valid." See Collins English Dictionary—Complete & Unabridged 10th Edition (1998) (attached).*

*Primary Examiner* — Peter L Ludwig
(74) *Attorney, Agent, or Firm* — Baker Hostetler LLP (57) ABSTRACT

The present invention relates to a system, a method, a service server, a mobile communication terminal, an end-point terminal, and a storage medium, for providing a service to an end-point terminal that uses authentication information of a mobile communication terminal to which it is not currently connected, wherein the end-point terminal is connected to a first mobile communication terminal and to a second mobile communication terminal through a short-range communication network and to a service server via the second mobile communication terminal. The end-point terminal uses the authentication information of the first mobile communication terminal and is connected to the service server which is connected to the first and second mobile communication terminals through the mobile communication network, for authenticating the end-point terminal that uses the authentication information of the first mobile communication terminal.

1 Claim, 7 Drawing Sheets

(51) Int. Cl.
*G01R 11/56* (2006.01)
*G01R 21/133* (2006.01)
*G06F 17/00* (2006.01)
*H04W 12/06* (2009.01)
*G06Q 30/04* (2012.01)
*H04L 29/06* (2006.01)
*H04M 15/00* (2006.01)
*H04W 4/24* (2009.01)
*H04W 84/18* (2009.01)

(52) U.S. Cl.
CPC .......... *H04L 63/0884* (2013.01); *H04M 15/00* (2013.01); *H04M 15/09* (2013.01); *H04M 15/43* (2013.01); *H04W 4/24* (2013.01); *H04M 2215/0168* (2013.01); *H04W 84/18* (2013.01)
USPC .................. 705/52; 705/63; 705/67; 705/75; 705/77; 705/78; 705/412

(56) References Cited

U.S. PATENT DOCUMENTS

| | | | |
|---|---|---|---|
| 5,959,999 A * | 9/1999 | An | 370/442 |
| 6,055,638 A * | 4/2000 | Pascal et al. | 726/20 |
| 2001/0037254 A1* | 11/2001 | Glikman | 705/26 |
| 2002/0176581 A1* | 11/2002 | Bilgic et al. | 380/270 |
| 2002/0187776 A1* | 12/2002 | Brassil et al. | 455/417 |

* cited by examiner

SYSTEM AND METHOD FOR PROVIDING SERVICE TO END TERMINAL THAT USES AUTHENTICATION INFORMATION OF ANOTHER MOBILE COMMUNICATION TERMINAL, SERVICE SERVER, MOBILE COMMUNICATION TERMINAL, END TERMINAL, AND STORAGE MEDIUM

TECHNICAL FIELD

The present invention relates to a system, a method, a service server, a mobile communication terminal, an end-point terminal, and a storage medium, for providing a service to an end-point terminal that uses authentication information of another mobile communication terminal, and more specifically to a technique for providing a service, in which an end-point terminal can use the service although authentication information of the end-point terminal is not authentication information of a currently connected mobile communication terminal.

BACKGROUND ART

With the advancement of information communication technologies, a variety of end-point terminals capable of playing back documents, images and moving pictures (hereinafter, 'documents, images and moving pictures' will be simply referred to as 'contents' for the convenience of explanation, unless otherwise specified), such as MPeg audio layer-3 (MP3) players, Personal Multimedia Players (PMP) and Ultra Mobile Personal Computers (UMPC), are widely used. A user downloads desired contents from personal computers (PC) and plays back the downloaded contents. However, there is a problem in that the user cannot download desired contents when the user is moving or cannot connect to a PC.

In order to solve the problem, proposed are techniques for adding a communication means connectible to a short-range communication network onto an end-point terminal, such as a Bluetooth or an ultra-wideband (UWB), and connecting the end-point terminal to a mobile communication terminal through the short-range communication network. According to the techniques, a user can be provided with a desired service through an end-point terminal and a mobile communication terminal of the user.

On the other hand, there are some cases incapable of using the mobile communication terminal of the user due to a breakdown of the terminal, discharge of a battery, or the like. In this case, the user should wait until the mobile communication terminal normally operates or should be provided with the service through a mobile communication terminal of another user. At this point, if a fee is charged for using the service, the user should make a reasonable agreement with another user on the fee charged on the mobile communication terminal of another user, and thus the techniques cannot be easily applied in these cases.

DISCLOSURE OF INVENTION

Technical Problem

Therefore, the present invention has been made in view of the above problems, and it is an object of the present invention to provide a technique for providing a service, in which although an end-point terminal user is provided with the service through a mobile communication terminal of another user, a service fee or the like is charged on a mobile communication terminal of the user, and thus the user can easily use the service without making an agreement on the service fee or the like.

Technical Solution

To accomplish the above object, according to an embodiment of the present invention, there is provided a system for providing a service to an end-point terminal that uses authentication information of another mobile communication terminal, the system comprising: the end-point terminal connected to a first mobile communication terminal and a second mobile communication terminal through a short-range communication network and connected to a service server via the second mobile communication terminal, for using the service by using authentication information of the first mobile communication terminal; the second mobile communication terminal connected to the end-point terminal through the short-range communication network and connected to the service server through a mobile communication network, and connecting the end-point terminal that uses the authentication information of the first mobile communication terminal to the service server; and the service server connected to the first and second mobile communication terminals through the mobile communication network, for authenticating the end-point terminal that uses the authentication information of the first mobile communication terminal to use the service through the second mobile communication terminal.

In the embodiment, the service server may authenticate the end-point terminal to use the service only when authentication options selected by the end-point terminal and the second mobile communication terminal match.

In the embodiment, the authentication option may include information on whether a service fee will be charged only on the first mobile communication terminal or on both of the first and second mobile communication terminals.

In the embodiment, the service providing system may further comprise a billing server connected to the service server through the mobile communication network or a wired communication network, for performing a billing process on the first mobile communication terminal or the second mobile communication terminal depending on the authentication option, when the end-point terminal is provided with the service.

According to another embodiment of the present invention, there is provided a method for providing a service to an end-point terminal that uses authentication information of another mobile communication terminal, performed by a system in which an end-point terminal is connected to first and second mobile communication terminals through a short-range communication network, the first and second mobile communication terminals are connected to a service server through a mobile communication network, and the service server is connected to a billing server through a wired communication network, the method comprising the steps of: connecting to the service server via the first mobile communication terminal, by the end-point terminal; requesting the service server to transmit authentication information of the first mobile communication terminal, by the end-point terminal; receiving an authentication information transmission permission signal from the first mobile communication terminal and transmitting the authentication information of the first mobile communication terminal to the end-point terminal, by the service server; connecting to the service server via the second mobile communication terminal and transmitting the authentication information of the first mobile communication terminal, by the end-point terminal; confirming whether or not authentication options selected by the end-point terminal and the second mobile communication terminal match, by the service server; and providing the end-point terminal with the service, by the service server, if the authentication options selected by the end-point terminal and the second mobile communication terminal match.

In the embodiment, the authentication option may include information on whether a service fee will be charged only on the first mobile communication terminal or on both of the first and second mobile communication terminals.

In the embodiment, the service providing method may further comprise the step of: performing a billing process on the first or second mobile communication terminal depending on the authentication option, by the billing server, after the service server provides the service.

According to still another embodiment of the present invention, there is provided a service server for providing a service to an end-point terminal that uses authentication information of another mobile communication terminal, the server comprising: a communication unit for transmitting and receiving data through a mobile communication network; a mobile communication terminal management unit for managing information on first and second mobile communication terminals received through the communication unit; an end-point terminal management unit for managing information on the end-point terminal received through the communication unit; a short-range communication network management unit for managing information on a short-range communication network that relays communications between the first mobile communication terminal and the end-point terminal and between the second mobile communication terminal and the end-point terminal; a storage unit for storing the information on the first and second mobile communication terminals, on the end-point terminal, and on the short-range communication network, and authentication information of the first mobile communication terminal provided to the end-point terminal; and a control unit for controlling operation of each constitutional component, controlling the communication unit to provide the authentication information of the first mobile communication terminal in response to a request from the end-point terminal, and authenticating the end-point terminal to use the service when the end-point terminal connected through the second mobile communication terminal provides the authentication information of the first mobile communication terminal.

In the embodiment, the control unit may authenticate the end-point terminal to use the service only when authentication options selected by the end-point terminal and the second mobile communication terminal match.

According to still another embodiment of the present invention, there is provided a method for providing a service to an end-point terminal that uses authentication information of another mobile communication terminal by a service server, the method comprising the steps of: receiving a request for authentication information of a first mobile communication terminal from the end-point terminal; providing the end-point terminal with the authentication information of the first mobile communication terminal depending on permission of the first mobile communication terminal; receiving a connection request of the end-point terminal having the authentication information of the first mobile communication terminal via the second mobile communication terminal; confirming whether or not authentication options selected by the end-point terminal and the second mobile communication terminal match; and providing the end-point terminal with the service, if the authentication options match.

According to still another embodiment of the present invention, there is provided a storage medium for storing the method for providing a service to an end-point terminal that uses authentication information of another mobile communication terminal by a service server, as a program.

According to still another embodiment of the present invention, there is provided a mobile communication terminal permitting connection of an end-point terminal that uses authentication information of another mobile communication terminal, the mobile communication terminal comprising: a first communication unit for transmitting and receiving data through a mobile communication network; a second communication unit for transmitting and receiving data through a short-range communication network; an end-point terminal management unit for managing information on the end-point terminal; a storage unit for storing authentication information of the mobile communication terminal; and a control unit for controlling operation of each constitutional component, selecting an authentication option for the end-point terminal connected through the short-range communication network, and permitting connection of the end-point terminal to the service server if the selected authentication option matches an authentication option selected by the end-point terminal.

According to still another embodiment of the present invention, there is provided a method for permitting connection of an end-point terminal that uses authentication information of another mobile communication terminal by a mobile communication terminal, the method comprising the steps of: connecting the end-point terminal having the authentication information of another mobile communication terminal to the mobile communication terminal; transferring the authentication information to a service server, selecting an authentication option for the end-point terminal, and confirming whether or not the selected authentication option matches an authentication option selected by the end-point terminal; and relaying connections between the end-point terminal and the service server, if the authentication option selected for the end-point terminal matches the authentication option selected by the end-point terminal.

According to still another embodiment of the present invention, there is provided a storage medium for storing the method for permitting connection of an end-point terminal that uses authentication information of another mobile communication terminal by a mobile communication terminal, as a program.

According to still another embodiment of the present invention, there is provided an end-point terminal for using a service by using authentication information of another mobile communication terminal, the end-point terminal comprising: a communication unit for transmitting and receiving data through a short-range communication network; an input unit for receiving a user command; a playback unit for playing back service contents received from a service server; a storage unit for storing authentication information of first and second mobile communication terminals received from the service server; and a control unit for controlling operation of each constitutional component and controlling the communication unit to receive the authentication information of the first mobile communication terminal from the service server in response to a user command inputted through the input unit, transmit the authentication information of the first mobile communication terminal to the second mobile communication terminal if the second mobile communication terminal is connected, and transmit an authentication option inputted through the input unit to the second mobile communication terminal.

According to still another embodiment of the present invention, there is provided a method for using a service by using authentication information of another mobile communication terminal by an end-point terminal, the method comprising the steps of: requesting authentication information of a first mobile communication terminal from a service server; receiving and storing the authentication information from the service server; selecting an authentication option; and using the service depending on authentication of the service server.

According to still another embodiment of the present invention, there is provided a storage medium for storing the method for using a service by using authentication information of another mobile communication terminal by an end-point terminal, as a program.

Advantageous Effects

The present invention is effective in that although a user uses a service through the second mobile communication terminal of another person, a service fee can be charged on the first mobile communication terminal of the user. Therefore, the user does not need to make an agreement with another person on the service fee, and thus the end-point terminal can easily use the service from the service server via the second mobile communication terminal.

BEST MODE FOR CARRYING OUT THE INVENTION

The preferred embodiments of the present invention will be hereafter described in detail, with reference to the accompanying drawings.

The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

First, a service providing system for providing a service to an end-point terminal that uses authentication information of another mobile communication terminal according to an embodiment of the invention will be described with reference to FIG. 1.

Figure 1:
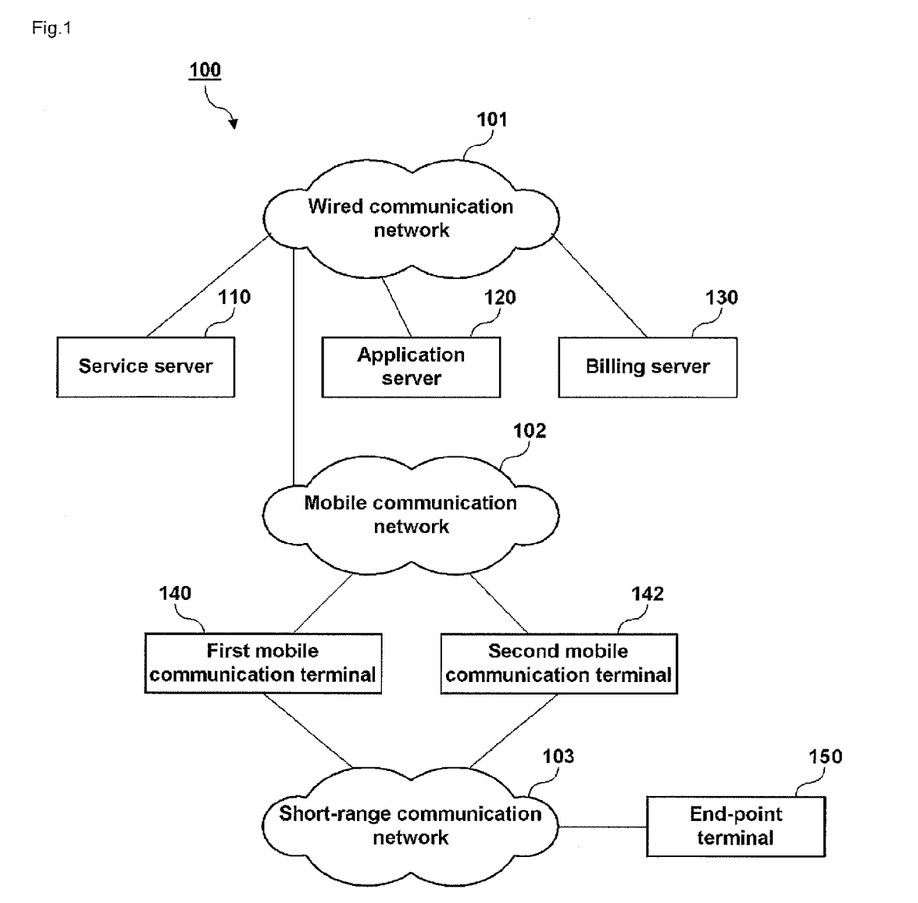
FIG. 1 is a block diagram showing a service providing system according to an embodiment of the present invention.

FIG. 1 is a block diagram showing a service providing system according to an embodiment of the present invention.

As shown in FIG. 1, a service providing system 100 for providing a service to an end-point terminal that uses authentication information of another mobile communication terminal according to the embodiment (hereinafter, 'a service providing system for providing a service to an end-point terminal that uses authentication information of another mobile communication terminal' will be simply referred to as 'a service providing system' for the convenience of explanation, unless otherwise specified) is configured to connect a service server 110, an application server 120, and a billing server 130 through a wired communication network 101 and/or a mobile communication network 102, to connect the service server 110 to first and second mobile communication terminals 140 and 142 through the mobile communication network 102, and to connect the first or second mobile communication terminal 140 or 142 to an end-point terminal 150 through a short-range communication network 103. The short-range communication networks used in this system can be a wireless LAN, a Bluetooth, a UWB, or the like. In addition, the application server 120 and/or the billing server 130 can be included in the service server 110 as a constitutional component.

The end-point terminal 150 is connected to the service server 110 via the second mobile communication terminal 142 and uses a service by using authentication information of the first mobile communication terminal 140 (←110).

The first mobile communication terminal 140 allows the end-point terminal 150 to use the authentication information.

The second mobile communication terminal 142 connects the end-point terminal 150 that uses the authentication information of the first mobile communication terminal 140 to the service server 110. Here, although it is shown that the first and second mobile communication terminals 140 and 142 and the end-point terminal 150 are connected through the same short-range communication network 103, the present invention does not need to be particularly restricted thereto, and it should be noted that the terminals can be connected through short-range communication networks 103 different from one another. That is, if the end-point terminal moves to another place after connecting to the first mobile communication terminal through a short-range communication network, the end-point terminal can be connected to the second mobile communication terminal through another short-range communication network. Accordingly, it is notable that the connection between the end-point terminal and the second mobile communication terminal may be different from the connection between the end-point terminal and the first mobile communication terminal in time and space.

The service server 110 authenticates the end-point terminal 150 that uses the authentication information of the first mobile communication terminal 140 to use the service through the second mobile communication terminal 142. In addition, the service server 110 provides a service desired to be used by the end-point terminal 150. It is notable that the service can be provided by the application server 120 in some cases. The service server 110 preferably authenticates the end-point terminal 150 to use the service only when authentication options selected by the end-point terminal 150 and the second mobile communication terminal 142 match. Here, the authentication option includes information on whether a service fee will be charged only on the first mobile communication terminal or on both of the first and second mobile communication terminals. If the authentication options do not match, the service cannot be provided.

The application server 120 stores services, contents, and the like used by the end-point terminal 150.

If the end-point terminal 150 is provided with the service, the billing server 130 performs a billing process on the first mobile communication terminal 140 and/or the second mobile communication terminal 142 depending on the authentication option.

Hereinafter, a method for providing a service to an end-point terminal that uses authentication information of another mobile communication terminal according to an embodiment of the invention will be described with reference to FIG. 2.

Figure 2:
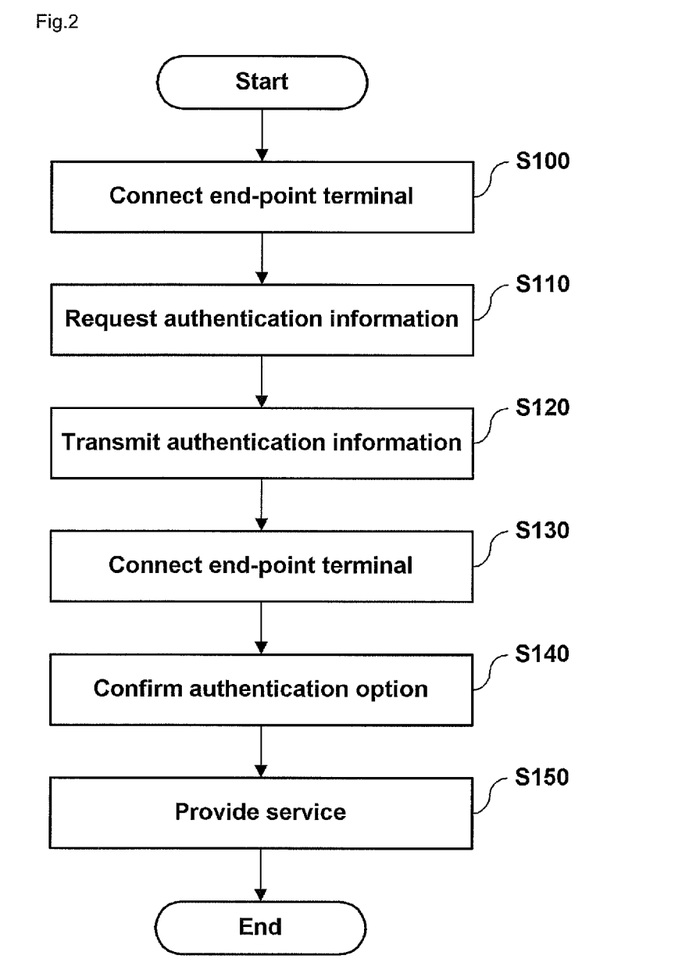
FIG. 2 is a flowchart illustrating a service providing method according to an embodiment of the present invention.

FIG. 2 is a flowchart illustrating a service providing method according to an embodiment of the present invention.

As shown in FIG. 2, a method for providing a service to an end-point terminal that uses authentication information of another mobile communication terminal according to the embodiment (hereinafter, 'a method for providing a service to an end-point terminal that uses authentication information of another mobile communication terminal' will be simply referred to as 'a service providing method' for the convenience of explanation, unless otherwise specified) can be applied to a system in which the end-point terminal is connected to first and second mobile communication terminals through a short-range communication network, the first and second mobile communication terminals are connected to a service server through a mobile communication network, and the service server is connected to a billing server through a wired communication network.

As a first step, the end-point terminal is connected to the service server via the first mobile communication terminal S100. When the end-point terminal is connected to the service server, the service server receives and stores information on the end-point terminal, information on the first mobile communication terminal, information on the short-range communication network, login information, and the like.

As a second step, the end-point terminal requests the service server to transmit authentication information of the first mobile communication terminal S110.

As a third step, the service server receives an authentication information transmission permission signal from the first mobile communication terminal and transmits the authentication information of the first mobile communication terminal to the end-point terminal S120. If the authentication information is transmitted, the service server records that the first mobile communication terminal permits transmission of the authentication information. The permission record is needed to prove validity of billing when a billing process is performed. The authentication information may include a USIM code, a user code, or the like.

As a fourth step, the end-point terminal connects to the service server via the second mobile communication terminal and transmits the authentication information of the first mobile communication terminal S130.

As a fifth step, the service server confirms whether or not authentication options selected by the end-point terminal and the second mobile communication terminal match S140. The authentication option used at this point preferably includes information on whether a service fee will be charged only on the first mobile communication terminal or on both of the first and second mobile communication terminals.

As a sixth step, if the authentication options selected by the end-point terminal and the second mobile communication terminal match, the service server provides the end-point terminal with the service S150. After performing the sixth step, the service providing method may further include the step of performing a billing process on the first mobile communication terminal and/or the second mobile communication terminal depending on the authentication option, by the billing server.

Hereinafter, a service server for providing a service to an end-point terminal that uses authentication information of another mobile communication terminal according to an embodiment of the invention will be described with reference to FIG. 3.

Figure 3:
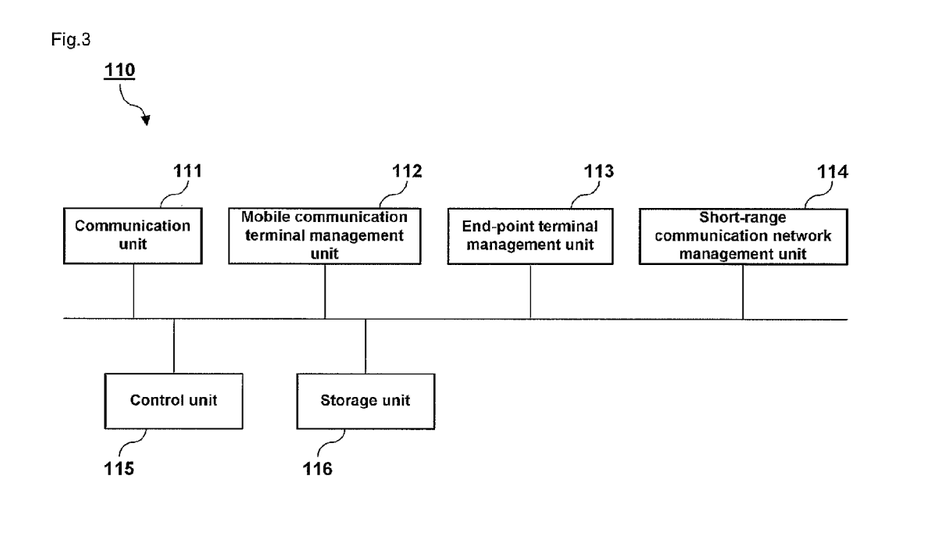
FIG. 3 is a block diagram showing a service server according to an embodiment of the present invention.

FIG. 3 is a block diagram showing a service server according to an embodiment of the present invention.

As shown in FIG. 3, in a service server 110 for providing a service to an end-point terminal that uses authentication information of another mobile communication terminal according to the embodiment (hereinafter, 'a service server for providing a service to an end-point terminal that uses authentication information of another mobile communication terminal' will be simply referred to as 'a service server' for the convenience of explanation, unless otherwise specified), a communication unit 111 transmits and receives data through a mobile communication network.

A mobile communication terminal management unit 112 manages information on first and second mobile communication terminals received through the communication unit 111.

An end-point terminal management unit 113 manages information on the end-point terminal received through the communication unit 111.

A short-range communication network management unit 114 manages information on a short-range communication network that relays communications between the first and second mobile communication terminals and the end-point terminal.

A storage unit 116 stores the information on the first and second mobile communication terminals, on the end-point terminal, and on the short-range communication network, and authentication information of the first mobile communication terminal provided to the end-point terminal.

A control unit 115 controls operation of each constitutional component, controls the communication unit 111 to provide the authentication information of the first mobile communication terminal in response to a request from the end-point terminal, and authenticates the end-point terminal to use the service when the end-point terminal connected through the second mobile communication terminal provides the authentication information of the first mobile communication terminal. Here, the control unit 115 preferably authenticates the end-point terminal 150 to use the service only when an authentication option relative to liability or a service fee is selected by the end-point terminal. In this case, the authentication information of the first mobile communication terminal should be matched to the authentication information of the second mobile communication terminal to prevent dispute among users of the mobile communication terminals. However, if a service fee is not charged for using the service, the authentication information need not necessarily match.

Hereinafter, a method for providing a service to an end-point terminal that uses authentication information of another mobile communication terminal by a service server according to an embodiment of the invention will be described with reference to FIG. 4.

Figure 4:
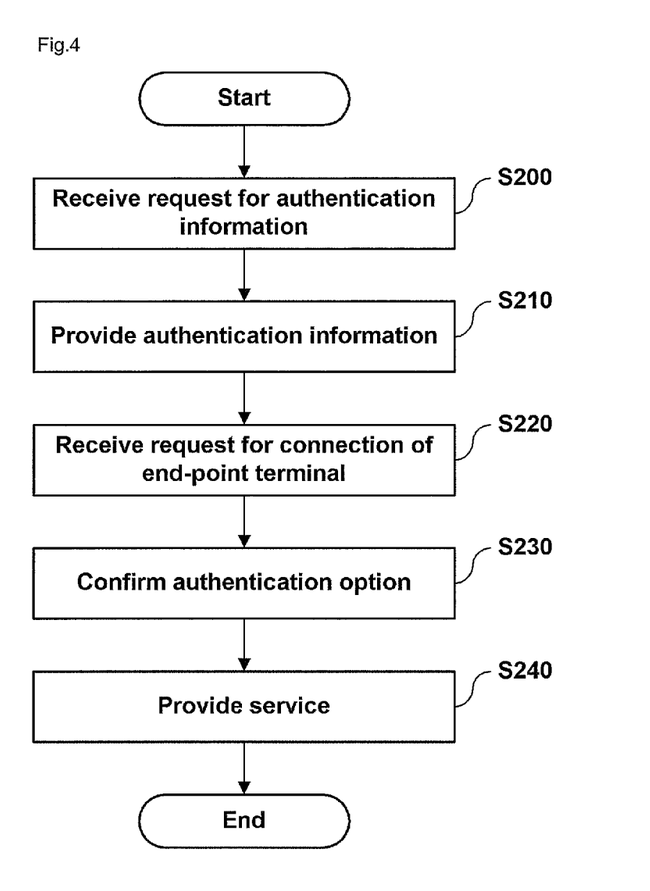
FIG. 4 is a flowchart illustrating a method for providing a service by a service server according to an embodiment of the present invention.

FIG. 4 is a flowchart illustrating a method for providing a service by a service server according to an embodiment of the present invention.

As shown in FIG. 4, in a method for providing a service to an end-point terminal that uses authentication information of another mobile communication terminal by a service server according to the embodiment (hereinafter, 'a method for providing a service to an end-point terminal that uses authentication information of another mobile communication terminal by a service server' will be simply referred to as 'a service providing method by a service server' for the convenience of explanation, unless otherwise specified), the service server receives a request for authentication information of a first mobile communication terminal from the end-point terminal S200, as a first step.

As a second step, the service server provides the end-point terminal with the authentication information of the first mobile communication terminal depending on permission of the first mobile communication terminal S210. If the authentication information is provided, the service server records that the authentication information has been provided, in the first mobile communication terminal information.

As a third step, the service server receives a connection request from the end-point terminal having the authentication information of the first mobile communication terminal via the second mobile communication terminal S220.

As a fourth step, the service server confirms whether or not authentication options selected by the end-point terminal and the second mobile communication terminal match S230. If the authentication options match, information on the authentication option is recorded in the second mobile communication terminal information.

As a fifth step, if the authentication options match, the service server provides the end-point terminal with the service S240.

On the other hand, the method for providing a service to an end-point terminal that uses authentication information of another mobile communication terminal by a service server is stored in a storage medium as a program.

Hereinafter, a mobile communication terminal permitting connection an end-point terminal that uses authentication information of another mobile communication terminal according to an embodiment of the invention will be described with reference to FIG. 5.

Figure 5:
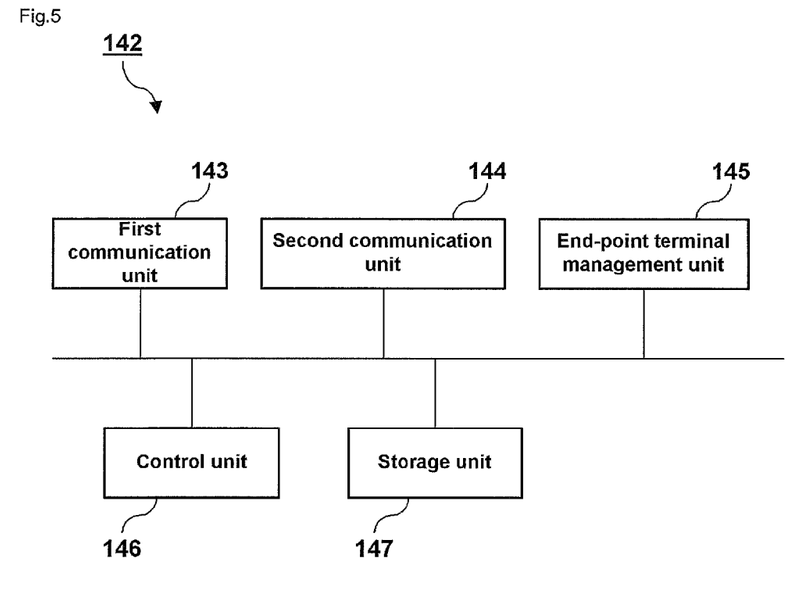
FIG. 5 is a block diagram showing a mobile communication terminal according to an embodiment of the present invention.

FIG. 5 is a block diagram showing a mobile communication terminal according to an embodiment of the present invention.

As shown in FIG. 5, in a mobile communication terminal 142 permitting connection of an end-point terminal that uses authentication information of another mobile communication terminal according to the embodiment (hereinafter, 'a mobile communication terminal permitting connection of an end-point terminal that uses authentication information of another mobile communication terminal' will be simply referred to as 'a mobile communication terminal' for the convenience of explanation, unless otherwise specified), a first communication unit 143 transmits and receives data through a mobile communication network.

A second communication unit 144 transmits and receives data through a short-range communication network. In order to accept various types of short-range communication networks, the second communication unit 144 can accommodate two or more short-range communication specifications.

An end-point terminal management unit 145 manages information on the end-point terminal.

A control unit 146 controls operation of each constitutional component, selects an authentication option for the end-point terminal connected through the short-range communication network, and permits connection of the end-point terminal to a service server if the selected authentication option matches an authentication option selected by the end-point terminal.

A storage unit 147 stores authentication information of the mobile communication terminal. The authentication information stored in the storage unit 147 can be provided to the service server and the end-point terminal.

Hereinafter, a method for permitting connection of an end-point terminal that uses authentication information of another mobile communication terminal by a mobile communication terminal according to an embodiment of the invention will be described with reference to FIG. 6.

Figure 6:
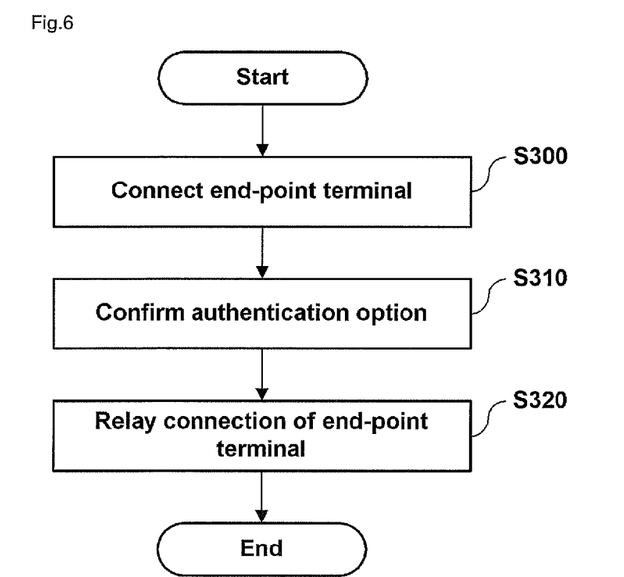
FIG. 6 is a flowchart illustrating a method for permitting connection of an end-point terminal by a mobile communication terminal according to an embodiment of the present invention.

FIG. 6 is a flowchart illustrating a method for permitting connection of an end-point terminal by a mobile communication terminal according to an embodiment of the present invention.

As shown in FIG. 6, in a method for permitting connection of an end-point terminal that uses authentication information of another mobile communication terminal by a mobile communication terminal according to the embodiment (hereinafter, 'a method for permitting connection of an end-point terminal that uses authentication information of another mobile communication terminal by a mobile communication terminal' will be simply referred to as 'a connection permitting method by a mobile communication terminal' for the convenience of explanation, unless otherwise specified), the end-point terminal having the authentication information of another mobile communication terminal is connected to the mobile communication terminal S300, as a first step.

As a second step, the mobile communication terminal transfers the authentication information to the service server, selects an authentication option for the end-point terminal, and confirms whether or not the selected authentication option matches an authentication option selected by the end-point terminal S310.

As a third step, if the authentication option selected for the end-point terminal matches the authentication option selected by the end-point terminal, the mobile communication terminal relays connections between the end-point terminal and the service server S320.

On the other hand, the method for permitting connection of an end-point terminal that uses authentication information of another mobile communication terminal by a mobile communication terminal is stored in a storage medium as a program.

Hereinafter, an end-point terminal for using a service by using authentication information of another mobile communication terminal according to an embodiment of the invention will be described with reference to FIG. 7.

Figure 7:
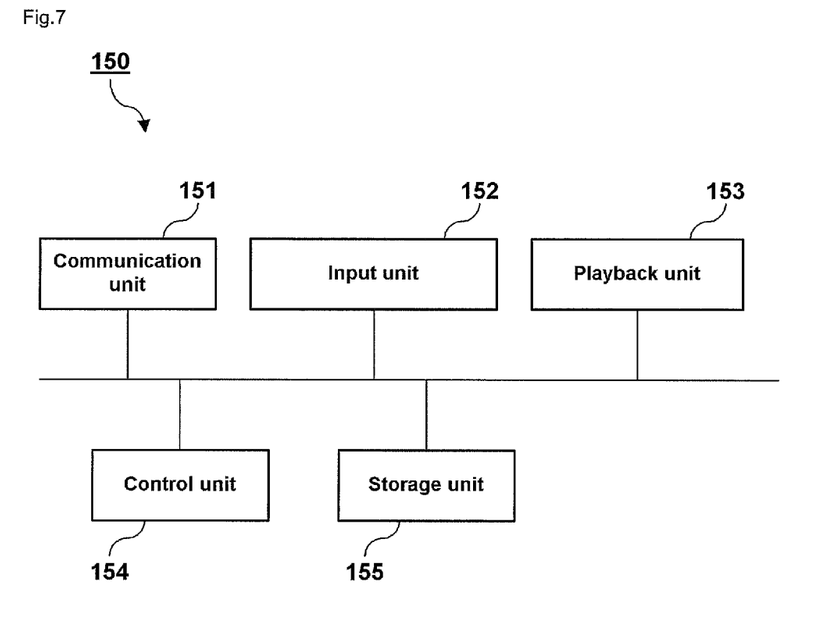
FIG. 7 is a block diagram showing an end-point terminal according to an embodiment of the present invention.

FIG. 7 is a block diagram showing an end-point terminal according to an embodiment of the present invention.

As shown in FIG. 7, in an end-point terminal 150 for using a service by using authentication information of another mobile communication terminal according to the embodiment (hereinafter, 'an end-point terminal for using a service by using authentication information of another mobile communication terminal' will be simply referred to as 'an end-point terminal' for the convenience of explanation, unless otherwise specified), a communication unit 151 transmits and receives data through a short-range communication network.

An input unit 152 receives a user command. Input means such as a switch, a keypad, a keyboard, a touch screen and the like can be used as the input unit 152.

A playback unit 153 plays back service contents received from a service server.

A storage unit 155 stores authentication information of a first mobile communication terminal and/or a second mobile communication terminal received from the service server.

A control unit 174 controls operation of each constitutional component and controls the communication unit 151 to receive the authentication information of the first mobile communication terminal from the service server in response to a user command inputted through the input unit 152, transmit the authentication information of the first mobile communication terminal to the second mobile communication terminal if the second mobile communication terminal is connected, and transmit an authentication option inputted through the input unit 152 to the second mobile communication terminal.

Hereinafter, a method for using a service by using authentication information of another mobile communication terminal by an end-point terminal according to an embodiment of the invention will be described with reference to FIG. 8.

Figure 8:
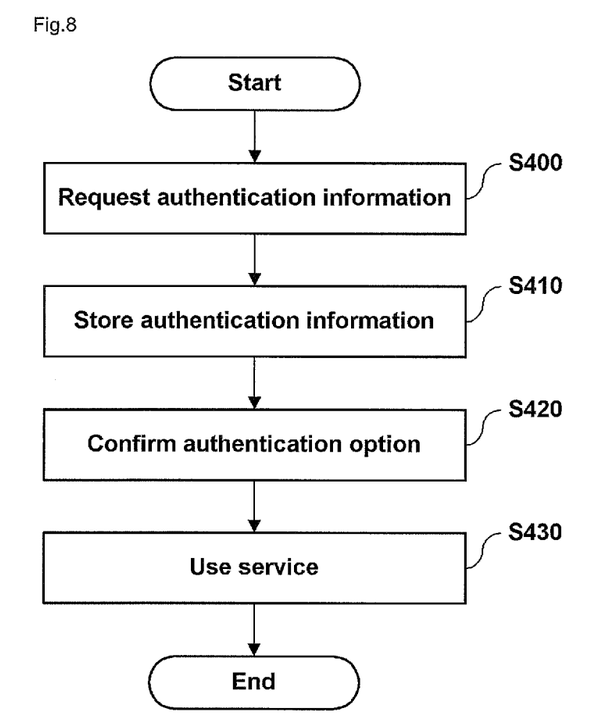
FIG. 8 is a flowchart illustrating a method for using a service by an end-point terminal according to an embodiment of the present invention.

FIG. 8 is a flowchart illustrating a method for using a service by an end-point terminal according to an embodiment of the present invention.

As shown in FIG. 8, in a method for using a service by using authentication information of another mobile communication terminal by an end-point terminal according to the embodiment (hereinafter, 'a method for using a service by using authentication information of another mobile communication terminal by an end-point terminal' will be simply referred to as 'a method for using a service by an end-point terminal' for the convenience of explanation, unless otherwise specified), the end-point terminal requests authentication information of a first mobile communication terminal from a service server S400, as a first step.

As a second step, the end-point terminal receives and stores the authentication information from the service server S410.

As a third step, the end-point terminal selects an authentication option S420.

As a fourth step, the end-point terminal uses the service depending on authentication of the service server S430.

On the other hand, the method for using a service by using authentication information of another mobile communication terminal by an end-point terminal is stored in a storage medium as a program.

Hereinafter, an example of applying the present invention is described.

As a first step, a user connects to the service server via the first mobile communication terminal using the end-point terminal.

As a second step, the user requests authentication information from the service server using the end-point terminal in order to cope with unavailability of the first mobile communication terminal.

As a third step, the service server examines whether or not the first mobile communication terminal permits providing the authentication information, and if the first mobile communication terminal permits providing the authentication information, the service server transmits the authentication information to the end-point terminal.

As a fourth step, if the first mobile communication terminal cannot operate normally due to a breakdown, discharge of a battery, or the like, the user searches for the second mobile communication terminal through a short-range communication network and connects to the service server via the second mobile communication terminal.

As a fifth step, the end-point terminal transmits authentication information of the first mobile communication terminal to the service server and selects an authentication option.

As a sixth step, the second mobile communication terminal selects an authentication option.

As a seventh step, the service server compares the authentication options selected by the end-point terminal and the second mobile communication terminal, and if the authentication options match, the service server permits using the service.

According to the present invention described above, although a user uses a service through the second mobile communication terminal of another person, a service fee can be charged on the first mobile communication terminal of the user. Therefore, the user does not need to make an agreement with another person on the service fee, and thus the end-point terminal can easily use the service received from the service server via the second mobile communication terminal.

Embodiments of the present invention have been described above with reference to the accompanying drawings.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

According to the present invention, although an end-point terminal has only authentication information of a first mobile communication terminal, the end-point terminal can connect to a service server and use a service.

The invention claimed is:

1. A service server having a computer CPU for providing a service through a mobile communication network to an end-point terminal connected to a first mobile communication terminal and a second mobile communication terminal using information of the first mobile communication terminal representing authentication information of the first mobile communication terminal for authenticating use by the end point terminal of the information of the first mobile communication terminal to use the service through the second mobile communication terminal, the server comprising:

communication equipment for transmitting and receiving data through the mobile communication network;

a mobile communication terminal management computer program for managing information on said first and second mobile communication terminals received from said communication equipment;

an end-point terminal management computer program for managing information on the end-point terminal received through the communication equipment;

a short-range communication network management computer program for managing information on a short-range communication network that relays communications between the first mobile communication terminal and the end-point terminal and between the second mobile communication terminal and the end-point terminal, wherein the end-point terminal is connected to the first mobile communication terminal and the second mobile communication terminal through the short-range communication network;

a storage memory for storing said information received through the communication equipment on the end-point terminal, on the first and second communication terminals, and on the short-range communication network, and for storing said authentication information of the first mobile communication terminal provided to the end-point terminal;

a control program for controlling said communication equipment to provide the stored authentication information of the first mobile communication terminal in response to a request from the end-point terminal, wherein said control program makes a determination of an existence of a service fee and whether said service fee is being charged for the service and wherein upon a determination that said service fee is being charged for use of the service, authenticating the endpoint terminal to use the service only when received authentication information of the second mobile communication terminal matches the stored authentication information of the first mobile communication terminal, and wherein upon a determination that the service fee is not being charged, authenticating the end point to use the service without requiring the authentication information of the second mobile communication terminal match the stored authentication information of the first mobile communication terminal.

\* \* \* \* \*